(12) United States Patent
Jeon et al.

(10) Patent No.: US 10,393,939 B2
(45) Date of Patent: Aug. 27, 2019

(54) DISPLAY APPARATUS

(71) Applicant: SAMSUNG ELECTRONICS CO., LTD., Suwon-si (KR)

(72) Inventors: Wook-Jae Jeon, Hwaseong-si (KR); Young Chol Lee, Hwaseong-si (KR); Nae-Won Jang, Seongnam-si (KR); Seung Hun Chae, Suwon-si (KR); Jun Sung Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

(21) Appl. No.: 15/711,618

(22) Filed: Sep. 21, 2017

(65) Prior Publication Data

US 2018/0156959 A1 Jun. 7, 2018

(30) Foreign Application Priority Data

Dec. 5, 2016 (KR) .......................... 10-2016-0164496

(51) Int. Cl.
*F21V 7/04* (2006.01)
*F21V 8/00* (2006.01)

(52) U.S. Cl.
CPC .......... *G02B 6/0023* (2013.01); *G02B 6/009* (2013.01); *G02B 6/0031* (2013.01); *G02B 6/0068* (2013.01)

(58) Field of Classification Search
CPC .. G02B 6/0013; G02B 6/0023; G02B 6/0026; G02B 6/0031; G02B 6/009

USPC ................. 362/608, 612, 621–622
See application file for complete search history.

(56) References Cited

U.S. PATENT DOCUMENTS

| | | |
|---|---|---|
| 2009/0297090 A1 | 12/2009 | Bogner et al. |
| 2015/0285981 A1 | 10/2015 | Park et al. |
| 2016/0103365 A1 | 4/2016 | Sato |
| 2016/0104825 A1 | 4/2016 | Sato |
| 2016/0170120 A1 | 6/2016 | Shani et al. |

FOREIGN PATENT DOCUMENTS

EP 3 043 336 A1 7/2016

OTHER PUBLICATIONS

Communication dated May 2, 2018, issued by the European Patent Office in counterpart European Patent Application No. 17194819.3.

*Primary Examiner* — Jason M Han
(74) *Attorney, Agent, or Firm* — Sughrue Mion, PLLC

(57) ABSTRACT

A display apparatus includes: a display panel; a light source package configured to supply light; and a light guide plate configured to receive the light supplied by the light source package and guide the light to the display panel. The light source package includes: a light source configured to generate the light; a first reflector disposed around the light source; a light converter disposed between the light source and the light guide plate, the light converter being configured to convert properties of the light directed toward the light guide plate; and a second reflector protruding from the light converter toward the light source, the second reflector being configured to reflect the light generated by the light source toward the first reflector, and to reflect light reflected by the light converter toward the light guide plate.

20 Claims, 10 Drawing Sheets

DISPLAY APPARATUS

CROSS-REFERENCE TO RELATED APPLICATION(S)

This application claims priority from Korean Patent Application No. 10-2016-0164496, filed on Dec. 5, 2016 in the Korean Intellectual Property Office, the disclosure of which is incorporated herein by reference.

BACKGROUND

1. Fields

Example embodiments of the present disclosure relate to a display apparatus having improved color reproducibility.

2. Description of the Related Art

In general, a display apparatus is an apparatus which displays a screen, and includes a monitor or a television set. A display apparatus uses a self-luminous display panel such as an organic light emitting diode (OLED) panel, or a light-receiving and emitting display panel such as a liquid crystal display (LCD) panel.

The display apparatus which uses the light-receiving and emitting display panel may include a LCD panel on which a screen is displayed, and a backlight unit to supply light to the LCD panel. The backlight unit includes a light source module having light sources, and a plurality of optical sheets to receive light from the light sources and to guide the light to the display panel. The optical sheets may include a reflective sheet, a light guide plate, a prism sheet, a diffusion sheet, a polarizing sheet, and the like.

The color reproducibility of the display apparatus is improved through quantum dots (QDs). That is, the color reproducibility of the display apparatus can be improved through a quantum dot sheet provided behind the LCD panel.

However, quantum dots are vulnerable to moisture and oxidation. Therefore, if quantum dots are formed as a sheet, a separate coating layer should be formed on the sheet since the sheet is exposed over a large area.

SUMMARY

One or more example embodiments provide a display apparatus having a structure for improving color reproducibility.

One or more example embodiments also provide a display apparatus capable of reducing external influence on quantum dots.

According to an aspect of an example embodiment, there is provided a display apparatus including: a display panel; a light source package configured to supply light; and a light guide plate configured to receive the light supplied by the light source package and guide the light to the display panel; wherein the light source package includes: a light source configured to generate the light; a first reflector disposed around the light source; a light converter disposed between the light source and the light guide plate, the light converted being configured to convert properties of the light directed toward the light guide plate; and a second reflector protruding from the light converter toward the light source, the second reflector being configured to reflect the light generated by the light source toward the first reflector, and to reflect light reflected by the light converter toward the light guide plate.

The second reflector may include: a reflector body having a protruding shape, and a reflecting layer that is formed on a surface of the reflector body and is convex toward the light source, the reflecting layer being configured to reflect light.

The reflecting layer may include: a first reflecting layer that faces the light source; and a second reflecting layer that faces the light guide plate.

The second reflector may be integrated into the light converter.

The light converter may include: quantum dots; and a unit body in which the quantum dots are sealed, the unit body being configured to transmit light therethrough.

The quantum dots may be spaced apart from a center line passing through a center of the light source and a center of the second reflector.

The light converter may be integrated into the second reflector, and a thickness of a portion of the second reflector passing the center line may be greater than a thickness of another portion of the second reflector spaced apart from the center line.

The unit body may include: a first body; and a second body having a concave surface facing the first body, and wherein the quantum dots are disposed in a space formed by the concave surface of the second body, and are in contact with the first body.

The first reflector may have a concave surface on which the light source is disposed, and the light converter may be provided to cover the concave surface of the first reflector.

The second reflector may have a truncated cone shape protruding toward the light source.

The reflecting layer may have a curved surface that is convex toward the light source.

The reflecting layer may include an inorganic coating layer.

The display apparatus may further include a plurality of light sources, including the light source, disposed on the first reflector; and a plurality of second reflectors, including the second reflector, protruding from the light converter to face the plurality of light sources, respectively.

The light converter may include a plurality of quantum dot tubes, each of the plurality of quantum dot tubes may include a quantum dot and a transmission tube surrounding the quantum dot, and each of the plurality of quantum dot tubes may be arranged in a same direction.

According to an aspect of another example embodiment, there is provided a display apparatus including: a display panel; a light source package configured to supply light; and a light guide plate configured to receive the light supplied by the light source package and guide the light to the display panel, wherein the light source package includes: a light source configured to generate the light; a second reflector protruding toward the light source, the second reflector including a first reflecting layer that faces the light source and is configured to reflect the light generated by the light source; a first reflector disposed around the light source, and configured to reflect the light reflected by the first reflecting layer in a direction toward the light guide plate; and a light converter configured to transmit the light generated by the light source and the light reflected by the first reflector, and to convert properties of the light generated by the light source and the light reflected by the first reflector, and wherein the second reflector further includes a second reflecting layer that faces the light guide plate and is configured to reflect light reflected by the light converter toward the light guide plate.

The second reflector may include a reflector body extending from the light converter, and the first reflecting layer and second reflecting layer are formed on a surface of the second reflector.

According to an aspect of another example embodiment, there is provided a display apparatus including: a display panel; a light source package configured to supply light; and a light guide plate configured to receive the light supplied by the light source package and guide the light to the display panel, wherein the light source package includes: a light source configured to generate the light; a light converter disposed between the light source and the light guide plate, the light converter including quantum dots configured to convert properties of the light generated by the light source, and a light-transmissive body housing the quantum dots; and a reflector provided on the light-transmissive body, and protruding from the light-transmissive body toward the light source, and wherein the reflector includes a light-transmissive reflector body, and a reflecting layer that is disposed on the reflector body and is configured to reflect light bidirectionally.

The reflecting layer may include: a first reflecting layer that faces the light source; and a second reflecting layer that faces the light guide plate.

The display apparatus may further include a another reflector configured to reflect light reflected by the first reflecting layer toward the light converter.

The second reflecting layer may be configured to reflect the light generated by the light source and light reflected by the light converter toward the light guide plate.

BRIEF DESCRIPTION OF THE DRAWINGS

The above and/or other aspects o will become apparent and more readily appreciated from the following description of example embodiments, taken in conjunction with the accompanying drawings of which.

DETAILED DESCRIPTION

Configurations illustrated in the embodiments and the drawings described in the present specification are only examples, and thus it is to be understood that various modified examples, which may replace the embodiments and the drawings described in the present specification, are possible when filing the present application.

Also, like reference numerals or symbols provided in the drawings of the present specification represent members or components that perform the substantially same functions.

The terms used in the present specification are used to describe the example embodiments. Accordingly, it should be apparent to those skilled in the art that the following description of example embodiments is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combination thereof, but do not preclude the presence or addition of one or more other features, figures, steps, components, members, or combinations thereof.

Also, it will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, example embodiments will be described in detail with reference to the accompanying drawings.

Figure 1:
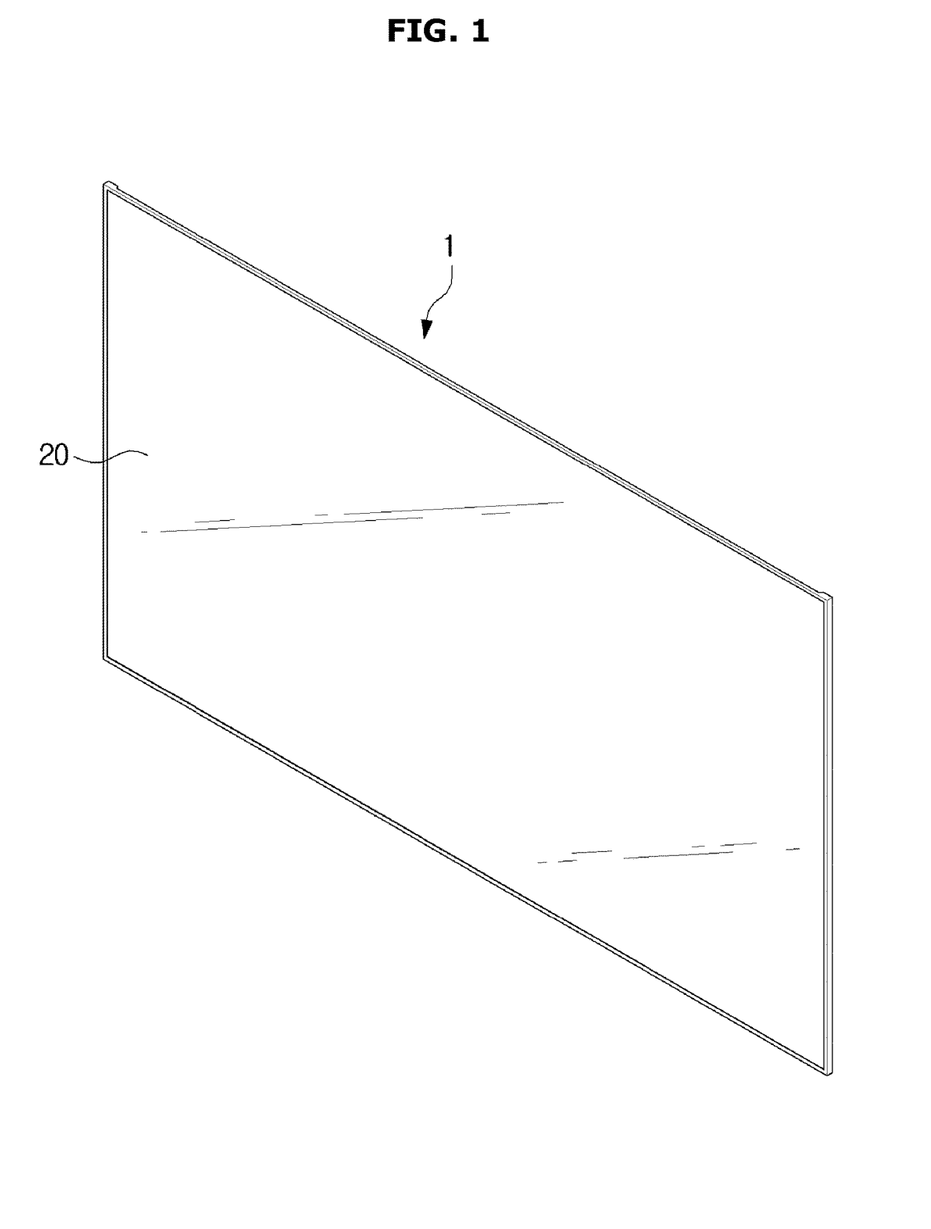
FIG. 1 is a perspective view of a display apparatus according to an example embodiment.
Figure 2:
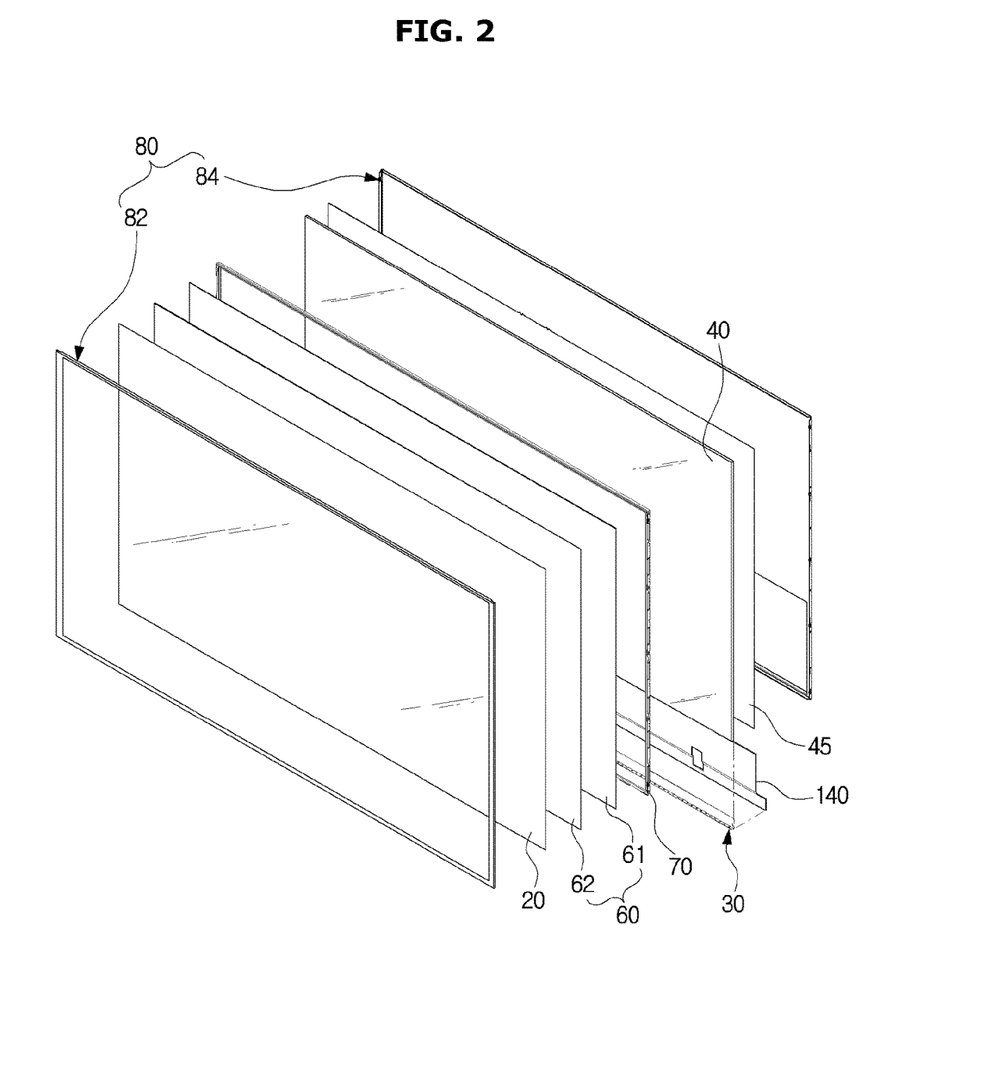
FIG. 2 is an exploded perspective view of a display apparatus according to an example embodiment.
Figure 3:
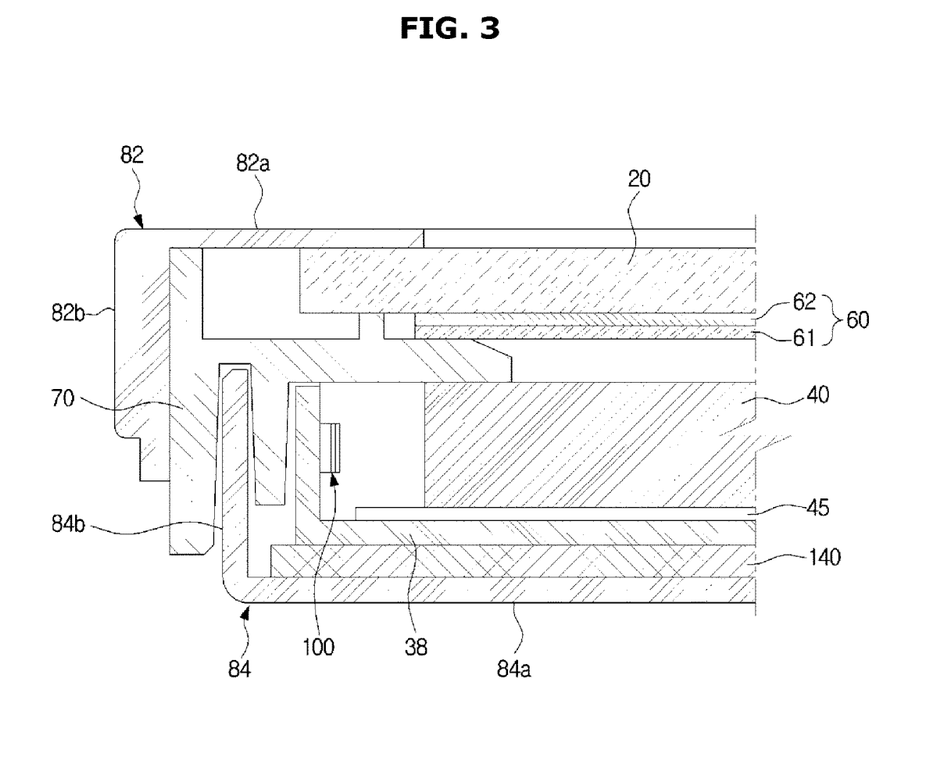
FIG. 3 is a cross-sectional view of a display apparatus according to an example embodiment.

FIG. 1 is a perspective view of a display apparatus according to an example embodiment. FIG. 2 is an exploded perspective view of a display apparatus according to an example embodiment. FIG. 3 is a cross-sectional view of a display apparatus according to an example embodiment.

For convenience of explanation, a display apparatus 1 shown in FIGS. 1, 2 and 3 is assumed to be a flat panel display apparatus, however the display apparatus 1 may be a curved display apparatus or a flexible (or bendable) display apparatus.

The display apparatus 1 may include a display module to display an image.

The display module may include a display panel 20 on which an image is displayed, and a backlight unit to supply light to the display panel 20. The backlight unit may include a light source module 30 and an optical sheet 60. More specifically, the backlight unit may include the light source module 30 disposed behind the display panel 20, a light guide plate 40 disposed in space between the display panel 20 and the light source module 30 to diffuse light generated by the light source module 30 and transfer the diffused light to the display panel 20 located, the optical sheet 60 disposed between the display panel 20 and the light guide plate 40 to convert optical properties of light, a middle mold 70 supporting the display panel 20 and the light guide plate 40, and a display chassis 80 forming an outer appearance of the display apparatus 1.

The display chassis 80 may include a top chassis 82 coupled to a front portion of the middle mold 70 and supporting the display panel 20 installed in the middle mold 70, and a bottom chassis 84 coupled to a rear portion of the middle mold 70, wherein the light source module 30 is disposed at both inner edges of the bottom chassis 84.

The light source module 30 may be disposed in the inside of the bottom chassis 84 to radiate light toward the light guide plate 40. In the current example embodiment, the light source module 30 may be disposed in a lower portion of the display module, although not limited thereto. According to other example embodiments, the light source module 30 may be disposed in at least one from among a lower portion, a side portion, and an upper portion of the display module, or the light source module 30 may be disposed along all the edges of the display module. Light sources of the light source module 30 may be arranged in the edge-type display manner or in a direct-type display manner.

The light guide plate 40, the display panel 20, and the top chassis 82 may be disposed in this order in the middle mold 70 in the front direction, and the bottom chassis 84 may be disposed behind the middle mold 70. The middle mold 70 may support the above-described components, and separate the display panel 20 and the bottom chassis 84 from each other.

As shown in FIG. 3, the top chassis 82 may include a bezel portion 82a to cover front edges of the display panel 20, and a top side surface portion 82b extending rearward from the outer ends of the bezel portion 82a to cover the side surfaces of the middle mold 70.

The bottom chassis 84 may include a rear surface portion 84a forming a rear surface of the display module, and a bottom side portion 84b extending forward from edges of the rear surface portion 84a and coupled into the middle mold 70.

Figure 4:
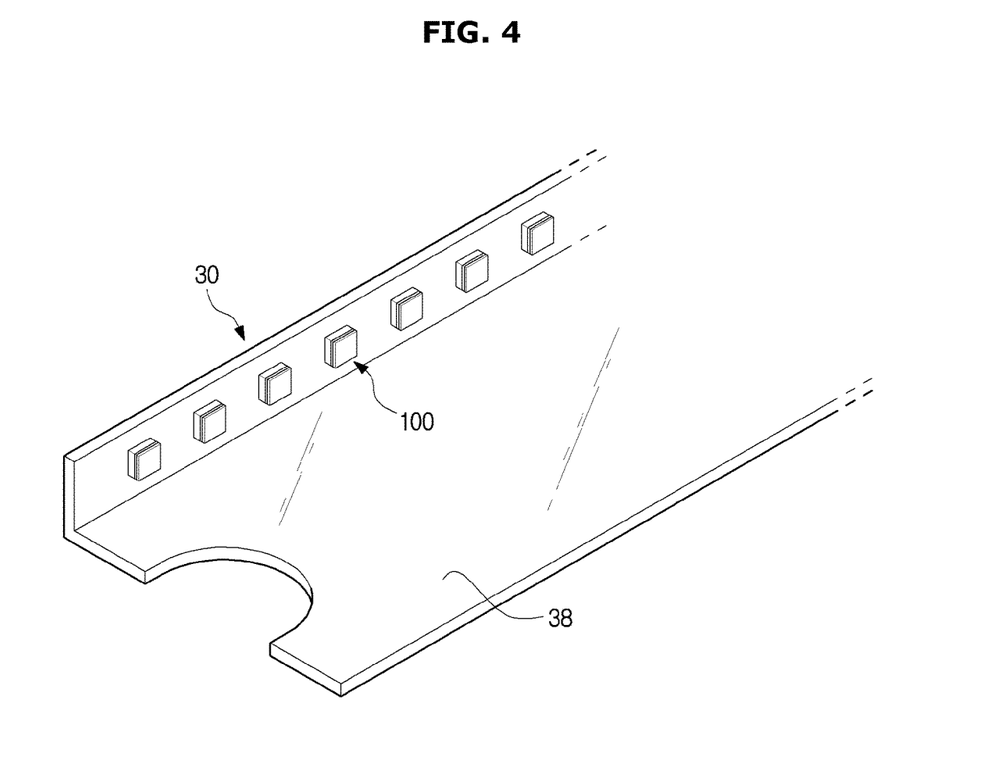
FIG. 4 is a perspective view illustrating a printed circuit board and a light source package of a display apparatus according to an example embodiment.

FIG. 4 is a perspective view illustrating a PCB and a light source package of a display apparatus according to an example embodiment. As shown in FIG. 4, the light source module 30 may include a light source package 100 and a printed circuit board (PCB) 38.

Figure 5:
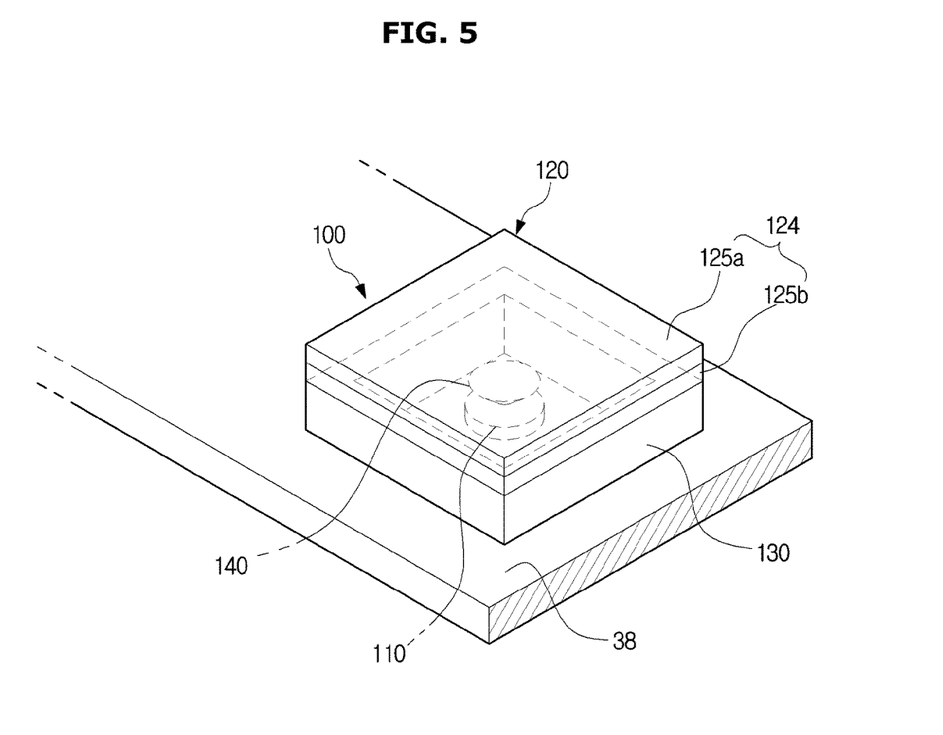
FIG. 5 is an enlarged perspective view of a light source package of a display apparatus according to an example embodiment.

FIG. 5 is an enlarged perspective view of a light source package of a display apparatus according to an example embodiment. As shown in FIG. 5, the light source package 100 may include a light source 110 and a light converter 120. The light source 110 may be a light emitting diode (LED). Also, a plurality of light sources 110 may be provided, and the plurality of light sources 110 may be arranged at regular intervals. Also, a plurality of light source packages 100 may be arranged with intervals on the PCB 38. The LED may be a blue LED. The light converter 120 will be described later.

The light guide plate 40 may be spaced apart from the bottom chassis 84 so that the light sources 110 are disposed on the bottom side portion 84b, that is, in both sides of the space between the light guide plate 40 and the inner surface of the bottom chassis 84.

A reflective member 45 may be provided on the rear surface of the light guide plate such that light emitted from the light sources 110 is directed to the front surface of the light guide plate 40. The reflective member 45 may be formed as a reflecting plate separately from the light guide plate 40 and disposed on the rear surface of the light guide plate 40, or the reflective member 45 may be integrated into the light guide plate 40. Also, the reflective member 45 may be formed by a reflective coating on the rear surface of the light guide plate 40.

The light guide plate 40 may guide light generated by the light sources 110. For this, the light guide plate 40 may be formed of a transparent resin material. The light guide plate 40 may be spaced a predetermined distance apart from the light sources 110 in order to minimize deformation due to heat generated by the light sources 110.

Figure 6:
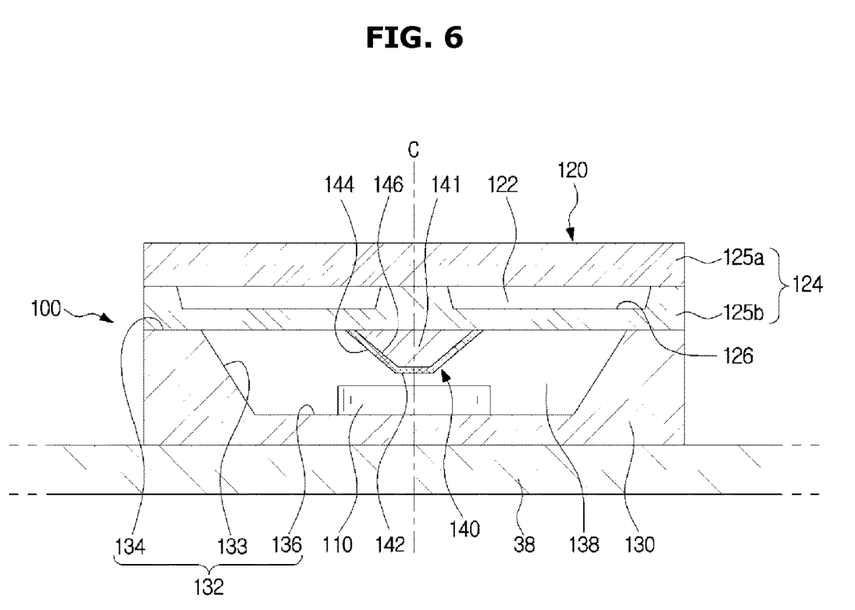
FIG. 6 is a cross-sectional view of a light source package of a display apparatus according to an example embodiment.

FIG. 6 is a cross-sectional view of a light source package of a display apparatus according to an example embodiment.

Figure 7:
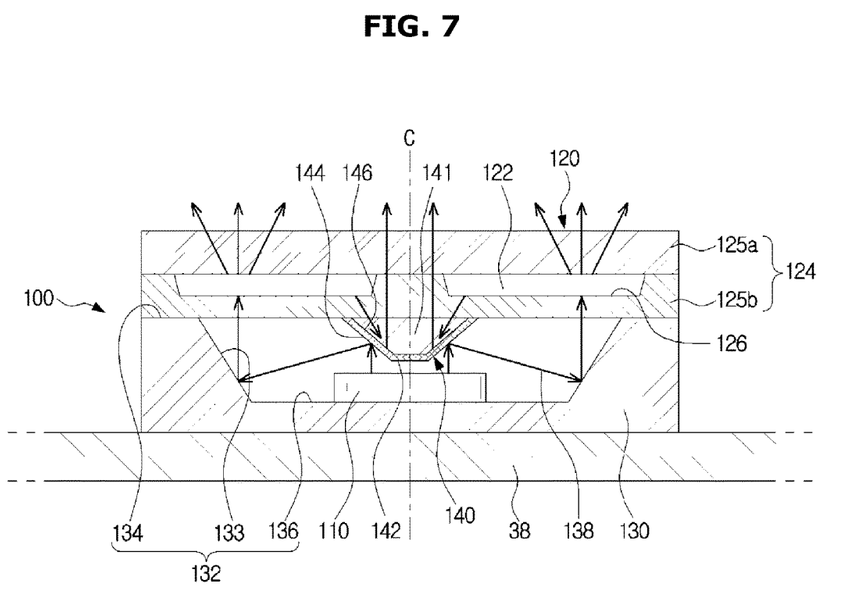
FIG. 7 is a view illustrating a light path in a light source package of a display apparatus according to an example embodiment.

FIG. 7 shows a light path in a light source package of a display apparatus according to an example embodiment.

The light source package 100 may include the light source 110 and the light converter 120. The light converter 120 may be disposed between the light source 110 and the light guide plate 40 to convert a wavelength of light emitted from the light source 110 to the light guide plate 40.

The light converter 120 may include a quantum dot (QD) 122 and a unit body 124 surrounding the quantum dot 122. The unit body 124 may form an arrangement space 126 in which the quantum dot 122 may be disposed. The arrangement space 126 of the unit body 124 may be hermetically closed, and the quantum dot 122 may be disposed in the hermetically closed arrangement space 126. With the configuration, the quantum dot 122 may not be exposed to an external environment to prevent oxidation or deformation of the quantum dot 122 due to moisture.

The quantum dot 122 may be spaced apart from a center line C passing through a center of the light source 110 and a center of a second reflector 140 which will be described later.

Light traveling along a light path from the center of the light source 110 to the light guide plate 40 may have an intensity that is greater than an intensity of light traveling along another light path at a different angle. As a result, the quantum dot 122 may be deformed or damaged by light traveling along the center line C of the light source 110. In order to reduce or prevent the problem, the quantum dot 122 may be spaced apart from the center line C.

The unit body 124 may be formed of a light transmissive material for transmission of light.

The unit body 124 may include a first body 125a, and a second body 125b which is in contact with the first body 125a and has a concave surface facing the first body 125a to form the arrangement space 126. That is, the unit body 124 may be configured such that the quantum dot 122 is sealed therein. The first and second bodies 125a and 125b may be in close contact with or coupled to each other so that the quantum dot 122 is not influenced from the outside.

In the current example embodiment, a surface of the second body 125b may be formed in a concave shape, and the first body 125a may be in close contact with or coupled with the second body 125b to form the arrangement space 126, although embodiments are not limited thereto. According to another example, both the facing surfaces of the first and second bodies 125a and 125b may be concave surfaces, and the first body 125a may be in close contact with or coupled with the second body 125b to form the arrangement space 126. Also, the first body 125a may have a concave surface facing the second body 125b, and may be in close contact with or coupled with the second body 125b to form the arrangement space 126.

Quantum dots will be described as follows. If electrons that have been in a valence band receive energy, they are excited to a conduction band. Thereafter, the electrons again lose their energy to fall to the valance band, and at this time, the energy is emitted as light. The quantum dots generate strong fluorescence in a narrow wavelength band, and can generate all colors of visible light according to their sizes. Also, since the quantum dots can themselves generate natural colors, the quantum dots show high color reproduction without color loss. The quantum dots generate light of a shorter wavelength at smaller particles, and light of a longer wavelength at larger particles. The quantum dots may be a compound, such as cadmium selenide (CdSe), cadmium sulfide (CdS), cadmium telluride (CdTe), zinc selenide (ZnSe), zinc telluride (ZnTe), and zinc sulfide (ZnS).

The light source package 100 may include a first reflector 130.

The light source 110 may be disposed on the first reflector 130. The first reflector 130 may be disposed on the PCB 38. The first reflector 130 may be disposed around the light source 110 to reflect light to the light converter 120. On an upper surface of the first reflector 130, a reflecting layer 132 for reflecting light may be formed. The reflecting layer 132 may reflect light on a light path of the light source 110.

The reflecting layer 132 may have a concave shape and include a reflecting cup portion 133 configured to receive the light source 110. The reflecting cup portion 133 may be inclined at an angle of reflection so as to reflect light. The reflection angle of the reflecting cup portion 133 is not limited as long as light reflected by the reflecting cup portion 133 can be directed to the light converter 120. A transmissive sealing material 138 may be filled between the reflecting cup portion 133 and the light converter 120. The reflecting cup portion 133 may be formed on an inner surface of the first reflector 130, and may include a bottom surface 136 on which the light source 110 is disposed. The light converter 120 may be disposed to cover the reflecting cup portion 133 of the first reflector 130.

The reflecting layer 132 may include a reflecting portion 134 extending from the reflecting cup portion 133 and facing the light guide plate 40.

The light source package 100 may include the second reflector 140.

The second reflector 140 may be disposed adjacent to the light converter 120, and may be configured to reflect light generated by the light source 110 and/or to reflect light reflected by the light converter 120.

The second reflector 140 may be formed on and protrude from the light converter 120 toward the light source 110. The second reflector 140 may be integrated into the light converter 120. A thickness of a portion of the second reflector 140 passing the center line C may be thicker than that of the other portion of the second reflector 140 spaced from the center line C. Since the thickness of the second reflector 140 is thickest around the center line C where light generated by the light source 110 has a greatest intensity, it is possible to reduce or prevent the damage to the quantum dot 122. In addition, light can be uniformly emitted from the light source package 100.

The second reflector 140 may protrude from the unit body 124 toward the light source 110. The second reflector 140 may disperse or reflect light generated by the light source 110 toward the reflecting layer 132 of the first reflector 130. Further, the second reflector 140 may reflect light reflected by the quantum dot 122 of the light converter 120 toward the light guide plate 40 again.

The second reflector 140 may include a reflector body 141 through which light can be transmitted, and a reflecting layer 142 formed on an outer surface of the reflector body 141. The reflector body 141 may be integrated into the unit body 124, and may be made of the same material as the unit body 124.

The reflecting layer 142 may be formed on a protruding surface of the second reflector 140. The reflecting layer 142 may reflect light from the inner and outer surfaces. The reflecting layer 142 may include a first reflecting layer 144 formed on an outer surface of the second reflector 140 and formed to be convex toward the light source 110, and a second reflecting layer 146 formed on a rear surface of the first reflecting layer 144 and formed to be convex toward the light source 110. The second reflecting layer 146 may be in contact with the reflector body 141. The reflecting layer 142 may be formed of an inorganic coating layer.

The second reflector 140 may be formed in the shape of a truncated cone. More specifically, a wide bottom surface of the truncated cone may be in contact with the light converter 120, and a narrow top surface of the truncated cone may face the light source 110. An inclined curved surface may be formed between the bottom surface and the top surface of the truncated cone. The reflecting layer 142 may be disposed along an upper surface of the truncated cone, that is, along an outer surface of the inclined curved surface. An outer surface of the reflecting layer 142 may be the first reflecting layer 144, and the second reflecting layer 146 may be formed on a rear surface of the first reflecting layer 144. However, the protruding shape of the second reflector 140 is not limited to this.

Light generated by the light source 110 may be reflected in various directions by the first reflecting layer 144. The light reflected by the first reflecting layer 144 in various directions may be reflected toward the light converter 120 by the reflecting cup portion 133 of the first reflector 130. When light passes through the light converter 120, a part of the light may be converted through the quantum dot 122, and another portion of the light may be reflected by the quantum dot 122. A part of the light reflected by the quantum dot 122 may be reflected again by the second reflecting layer 146 of the second reflector 140 to be directed toward the light guide plate 40. Since the quantum dot 122 is spaced apart from the center line C passing the light source 110, no quantum dot 122 may exist on the center line C. Therefore, light passing the center line C can be directed to the light guide plate 40 without being influenced by the quantum dot 122. However, in the example embodiment, the reflecting layer 142 of the second reflector 140 can prevent omission of the influence of the quantum dot 122 on the light, while protecting the quantum dot 122 from excessive light.

The reflector body 141 and the reflecting layer 142 of the reflector 140 may be formed separately so that the second reflector body 141 is covered by the reflecting layer 142, although embodiments are not limited thereto. For example, the reflector body 141 and the reflecting layer 142 may be integrated into one body, or the reflecting layer 142 may be coated on the reflector body 141.

Hereinafter, a display apparatus according to another example embodiment will be described. Hereinafter, repeated description of the same configurations as those described above will be omitted.

Figure 8:
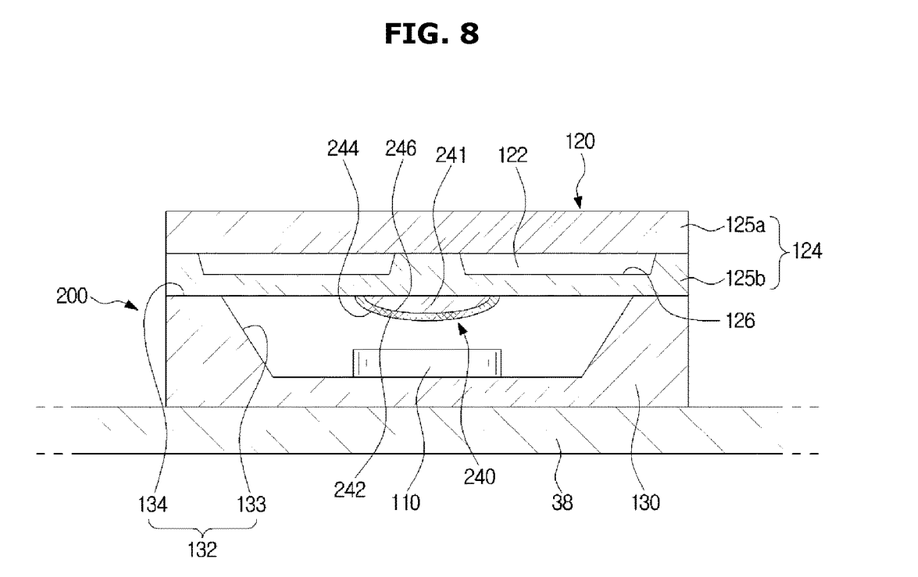
FIG. 8 is a cross-sectional view of a light source package of a display apparatus according to another example embodiment.

FIG. 8 is a cross-sectional view of a light source package of a display apparatus according to another example embodiment.

The light source package 100 may include a second reflector 240.

The second reflector 240 may be formed adjacent to the light converter 120, and may be configured to reflect light generated by the light source 110 or to reflect light reflected by the light converter 120.

The second reflector 240 may be formed on the light converter 120, and may protrude from the light converter 120 toward the light source 110. The second reflector 240 may be integrated into the light converter 120. The second reflector 240 may be integrated into the unit body 124.

The second reflector 240 may protrude from the unit body 124 toward the light source 110. The second reflector 240 may disperse or reflect light generated by the light source 110 toward the reflecting layer 132 of the first reflector 130. Further, the second reflector 240 may reflect light reflected by the quantum dot 122 of the light converter 120 toward the light guide plate 40 again.

The second reflector 240 may include a reflecting layer 242 formed on the outer surface.

The reflecting layer 242 may be formed on a protruding surface of the second reflector 240. The reflecting layer 242 may include a first reflecting layer 244 formed on an outer surface of the second reflector 240 and formed to be convex toward the light source 110, and a second reflecting layer 246 formed on a rear surface of the first reflecting layer 244 and formed to be convex toward the light source 110. The second reflecting layer 246 may be in contact with a reflector body 241 of the second reflector 240. The reflecting layer 242 may be formed of an inorganic coating layer.

The second reflector 240 may be formed in the shape of a convex curved surface toward the light source 110. The second reflector 240 may be in the shape of a portion of a sphere or in the shape of a portion of an elliptical ball.

The reflecting layer 242 may be formed on the convex curved surface of the second reflector 240. An outer surface of the reflecting layer 242 may be the first reflecting layer 244, and the second reflecting layer 246 may be formed on the rear surface of the first reflecting layer 244. However, the protruding shape of the second reflector 240 is not limited to this.

Hereinafter, a display apparatus according to still another example embodiment will be described. Hereinafter, repeated description of the same configurations as those described above will be omitted.

Figure 9:
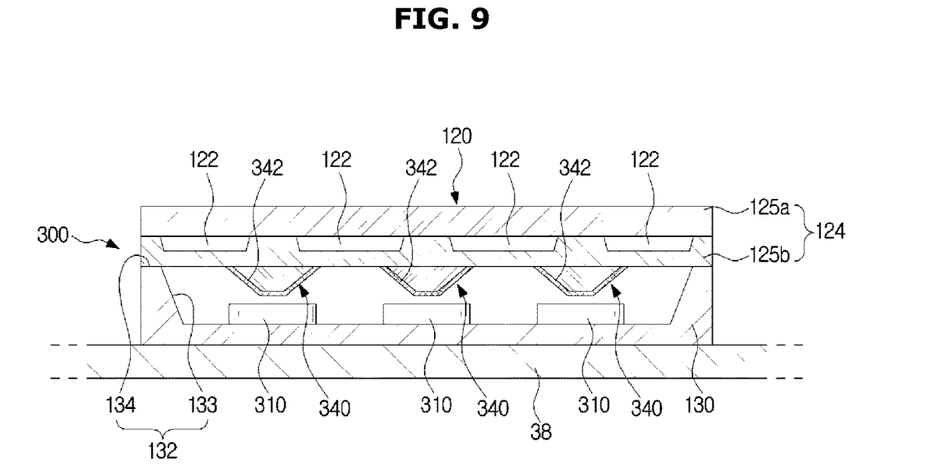
FIG. 9 is a cross-sectional view of a light source package of a display apparatus according to still another example embodiment.

FIG. 9 is a cross-sectional view of a light source package of a display apparatus according to still another example embodiment.

The light source package 300 may include a plurality of light sources 310 and a light converter 120.

The plurality of light sources 310 may be arranged in the reflecting cup portion 133 of the first reflector 130. In FIG. 9, the plurality of light sources 310 may be aligned, although embodiments are not limited thereto. More specifically, the plurality of light sources 310 may be arranged inside the first reflector 130 to form rows and columns with intervals.

The light source package 300 may include a plurality of second reflectors 340.

The plurality of second reflectors 340 may be formed adjacent to the light converter 120, and may be configured to reflect light generated by the plurality of light sources 310 or to reflect light reflected by the light converter 120.

The plurality of second reflectors 340 may be formed on and protrude from the light converter 120 toward the plurality of light source 310. The plurality of second reflectors 340 may be integrated into the light converter 120. That is, the plurality of second reflectors 340 may be integrated into the unit body 124.

The plurality of second reflectors 340 may protrude from the unit body 124 to face the plurality of light source 310. The plurality of second reflectors 340 may disperse or reflect light generated by the plurality of light sources 310 toward the reflecting layer 132 of the first reflector 130. Further, the plurality of second reflectors 340 may reflect light reflected by the quantum dot 122 of the light converter 120 toward the light guide plate 40 again.

The plurality of second reflectors 340 may include a unit reflecting layer 342 formed on the outer surface.

Hereinafter, a display apparatus according to still another example embodiment will be described. Hereinafter, repeated description of the same configurations as those described above will be omitted.

Figure 10:
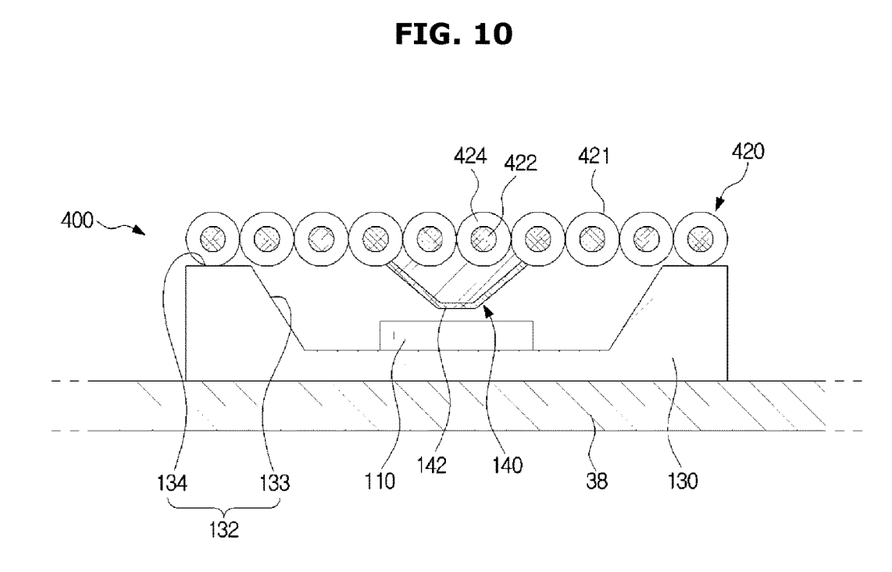
FIG. 10 is a cross-sectional view of a light source package of a display apparatus according to still another example embodiment.

FIG. 10 is a cross-sectional view of a light source package of a display apparatus according to still another example embodiment.

A light source package 400 may include the second reflector 140 and a light converter 420.

The light converter 420 may include a plurality of quantum dot tubes 421. Each quantum dot tube 421 may include a quantum dot 422 and a transmission tube 424 surrounding the quantum dot 422. The transmission tube 424 may form arrangement space therein, and the quantum dot 422 may be disposed in the arrangement space. The arrangement space of the transmission tube 424 may be hermetically closed, and the quantum dot 422 may be disposed in the hermetically closed space. Therefore, the quantum dot 422 may not be exposed to an external environment so as oxidation and deformation of the quantum dot 422 due to moisture. The plurality of quantum dot tubes 421 may be arranged side by side in a same direction.

The second reflector 140 may protrude from the transmission tube 424 of the plurality of quantum dot tubes 421 toward the light source 110. The second reflector 140 may be integrated into the plurality of quantum dot tubes 421.

According to the example embodiments, it is possible to improve the color reproducibility of the LCD apparatus for displaying images using light incident from the backlight unit.

According to the example embodiments, since the light source and the light converter are configured as a package, color reproducibility can be improved.

According to the example embodiments, it is possible to provide an optimum layout design of the quantum dots capable of improving color reproducibility and the light source in the display apparatus.

According to the example embodiments, it is possible to prevent the quantum dots from being damaged by light of excessive intensity, and to allow light to be reflected by the second reflector.

Although a few example embodiments have been shown and described above, the scope of the present disclosure is not limited to the aforementioned specific example embodiments. Those skilled in the art may variously modify the example embodiments without departing from the spirit and scope of the present disclosure defined by the following claims.

What is claimed is:
1. A display apparatus comprising:
a display panel;
a light source package configured to supply light; and
a light guide plate configured to receive the light supplied by the light source package and guide the light to the display panel;
wherein the light source package comprises:
a light source configured to generate the light;
a first reflector disposed around the light source;
a light converter disposed between the light source and the light guide plate, the light converter being configured to convert properties of the light directed toward the light guide plate; and
a second reflector protruding from the light converter toward the light source, the second reflector being configured to reflect the light generated by the light source toward the first reflector, and to reflect light reflected by the light converter toward the light guide plate.

2. The display apparatus according to claim 1, wherein the second reflector comprises:
a reflector body having a protruding shape, and
a reflecting layer that is formed on a surface of the reflector body and is convex toward the light source, the reflecting layer being configured to reflect light.

3. The display apparatus according to claim 2, wherein the reflecting layer comprises:
a first reflecting layer that faces the light source; and
a second reflecting layer that faces the light guide plate.

4. The display apparatus according to claim 1, wherein the second reflector is integrated into the light converter.

5. The display apparatus according to claim 1, wherein the light converter comprises:
quantum dots; and
a unit body in which the quantum dots are sealed, the unit body being configured to transmit light therethrough.

6. The display apparatus according to claim 5, wherein the quantum dots are spaced apart from a center line passing through a center of the light source and a center of the second reflector.

7. The display apparatus according to claim 6, wherein the light converter is integrated into the second reflector, and
a thickness of a portion of the second reflector passing through the center line is greater than a thickness of another portion of the second reflector spaced apart from the center line.

8. The display apparatus according to claim 5, wherein the unit body comprises:
a first body; and
a second body having a concave surface facing the first body, and
wherein the quantum dots are disposed in a space formed by the concave surface of the second body, and are in contact with the first body.

9. The display apparatus according to claim 1, wherein the first reflector has a concave surface on which the light source is disposed, and
the light converter is provided to cover the concave surface of the first reflector.

10. The display apparatus according to claim 1, wherein the second reflector has a truncated cone shape protruding toward the light source.

11. The display apparatus according to claim 2, wherein the reflecting layer has a curved surface that is convex toward the light source.

12. The display apparatus according to claim 2, wherein the reflecting layer includes an inorganic coating layer.

13. The display apparatus according to claim 1, further comprising a plurality of light sources, including the light source, disposed on the first reflector; and
a plurality of second reflectors, including the second reflector, protruding from the light converter to face the plurality of light sources, respectively.

14. The display apparatus according to claim 1, wherein the light converter comprises a plurality of quantum dot tubes,
each of the plurality of quantum dot tubes comprises a quantum dot and a transmission tube surrounding the quantum dot, and
each of the plurality of quantum dot tubes is arranged in a same direction.

15. A display apparatus comprising:
a display panel;
a light source package configured to supply light; and
a light guide plate configured to receive the light supplied by the light source package and guide the light to the display panel,
wherein the light source package comprises:
a light source configured to generate the light;
a second reflector protruding toward the light source, the second reflector comprising a first reflecting layer that faces the light source and is configured to reflect the light generated by the light source;
a first reflector disposed around the light source, and configured to reflect the light reflected by the first reflecting layer in a direction toward the light guide plate; and
a light converter configured to transmit the light generated by the light source and the light reflected by the first reflector, and to convert properties of the light generated by the light source and the light reflected by the first reflector, and
wherein the second reflector further comprises a second reflecting layer that faces the light guide plate and is configured to reflect light reflected by the light converter toward the light guide plate.

16. The display apparatus according to claim 15, wherein the second reflector comprises a reflector body extending from the light converter, and
the first reflecting layer and second reflecting layer are formed on a surface of the second reflector.

17. A display apparatus comprising:
a display panel;
a light source package configured to supply light; and
a light guide plate configured to receive the light supplied by the light source package and guide the light to the display panel,
wherein the light source package comprises:
a light source configured to generate the light;
a light converter disposed between the light source and the light guide plate, the light converter comprising quantum dots configured to convert properties of the light generated by the light source, and a light-transmissive body housing the quantum dots; and
a reflector provided on the light-transmissive body, and protruding from the light-transmissive body toward the light source, and
wherein the reflector comprises a light-transmissive reflector body, and a reflecting layer that is disposed on the reflector body and is configured to reflect light bidirectionally.

18. The display apparatus according to claim 17, wherein the reflecting layer comprises:
a first reflecting layer that faces the light source; and
a second reflecting layer that faces the light guide plate.

19. The display apparatus according to claim 18, further comprising a another reflector configured to reflect light reflected by the first reflecting layer toward the light converter.

20. The display apparatus according to claim 18, wherein the second reflecting layer is configured to reflect the light generated by the light source and light reflected by the light converter toward the light guide plate.

* * * * *